(12) United States Patent
Ikeda et al.

(10) Patent No.: US 7,400,775 B2
(45) Date of Patent: Jul. 15, 2008

(54) EDGE ENHANCEMENT SYSTEM AND METHOD AND IMAGING SYSTEM

(75) Inventors: Eiichiro Ikeda, Kanagawa (JP); Shoichi Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 692 days.

(21) Appl. No.: 10/982,751

(22) Filed: Nov. 3, 2004

(65) Prior Publication Data

US 2005/0100240 A1 May 12, 2005

(30) Foreign Application Priority Data

Nov. 6, 2003 (JP) .............................. 2003-377118

(51) Int. Cl.
*G06K 9/40* (2006.01)
(52) U.S. Cl. .................................... 382/254
(58) Field of Classification Search .................. 382/254
See application file for complete search history.

(56) References Cited

U.S. PATENT DOCUMENTS 5,579,419 A * 11/1996 Yaguchi et al. ............. 382/305
5,602,934 A * 2/1997 Li et al. ...................... 382/128
5,982,953 A * 11/1999 Yanagita et al. ............. 382/294
2003/0138162 A1* 7/2003 Hirai .......................... 382/266
2003/0156223 A1 8/2003 Min

FOREIGN PATENT DOCUMENTS

EP 0558017 A 9/1993
EP 1349113 A 10/2003
JP 4-342375 A 11/1992

* cited by examiner

*Primary Examiner*—Jingge Wu
*Assistant Examiner*—Tsung-Yin Tsai
(74) *Attorney, Agent, or Firm*—Canon U.S.A. Inc., IP Division (57) ABSTRACT

A plurality of bandpass filters extract high frequency components of a digital image signal sampled every predetermined unit, thus generating a plurality of high frequency signals. The high frequency signals are added to produce a resultant high frequency signal. On the basis of the value of the resultant high frequency signal, the maximum value or minimum value detected from the high frequency signals is selected. The resultant high frequency signal and the selected maximum or minimum value are added according to determined weights, so that an enhancement signal is generated. Edge enhancement is performed using the enhancement signal.

9 Claims, 6 Drawing Sheets

203 Ymix    208 Ysel    209 Yenhance

703 Mix

LARGE AMPLITUDE

EDGE ENHANCEMENT SYSTEM AND METHOD AND IMAGING SYSTEM

CROSS REFERENCE TO RELATED APPLICATION

This application claims priority from Japanese Patent Application No. 2003-377118 filed Nov. 6, 2003, which is hereby incorporated by reference herein.

BACKGROUND OF THE INVENTION

1. Field of the Invention

The present invention relates to an edge enhancement system and method for performing edge enhancement of image signals.

2. Description of the Related Art

Figure 5:
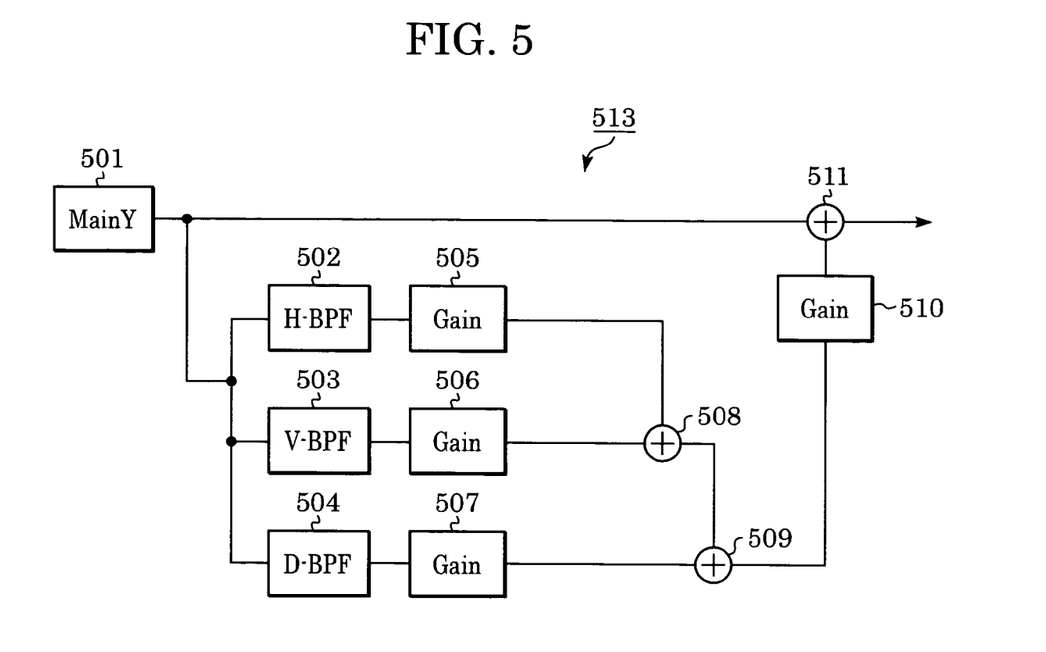
FIG. 5 is a block diagram of a conventional edge enhancement circuit 513.

FIG. 5 is a block diagram of a conventional edge enhancement circuit 513. In FIG. 5, a luminance-signal generation circuit (MainY) 501 generates a main luminance signal derived from image data on which edge enhancement is to be applied. A horizontal bandpass filter (H-BPF) 502 detects a horizontal edge component of the main luminance signal generated from the luminance-signal generation circuit 501 to generate a horizontal edge signal. A gain circuit 505 applies an arbitrary gain to the horizontal edge signal generated from the horizontal bandpass filter 502 to control the amplitude of the signal.

Similarly, a vertical bandpass filter (V-BPF) 503 detects a vertical edge component of the main luminance signal to generate a vertical edge signal, and a diagonal bandpass filter (D-BPF) 504 detects a diagonal edge component of the main luminance signal to generate a diagonal edge signal. Gain circuits 506 and 507 control the amplitudes of the corresponding edge signals, respectively.

Adders 508 and 509 add the horizontal, vertical, and diagonal edge signals to generate an edge enhancement signal. A gain circuit 510 controls the amplitude of the edge enhancement signal. Finally, an adder 511 adds the main luminance signal generated from the luminance-signal generation circuit 501 to the edge enhancement signal generated from the gain circuit 510, thus generating an edge-enhanced luminance signal.

Figure 6:
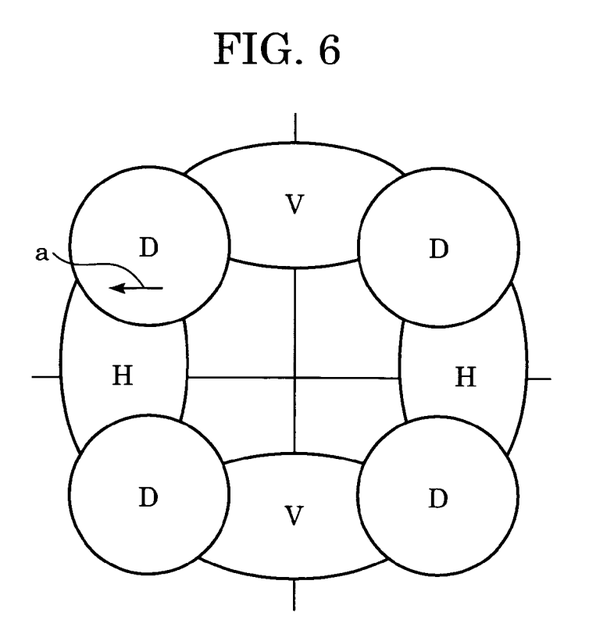
FIG. 6 shows a spatial frequency domain including regions occupied by horizontal, vertical, and diagonal edge signals.

In the conventional edge enhancement circuit 513, the horizontal, vertical, and diagonal edge signals are added, thus generating a resultant edge signal. When the amplitudes of the respective edge signals are large, the amplitudes overlap each other. Thus, the amplitude of the resultant edge signal is too large. This can result in the degradation of quality of an image subjected to edge enhancement. In this instance, a spatial frequency domain with the problem of amplitude overlap resulting in abnormally large amplitude will now be described. FIG. 6 shows regions occupied by the horizontal, vertical, and diagonal edge signals in the spatial frequency domain. Referring to FIG. 6, the abscissa denotes a horizontal spatial frequency axis and the ordinate denotes a vertical spatial frequency axis. As a region comes closer to the origin, its frequency becomes lower. Referring to FIG. 6, regions H are detected by the horizontal bandpass filter 502, regions V are detected by the vertical bandpass filter 503, and regions D are detected by the diagonal bandpass filter 504. A horizontal edge signal overlaps a diagonal edge signal in the region shown by the arrow a of FIG. 6. Thus, the above-mentioned problem occurs.

Figure 7:
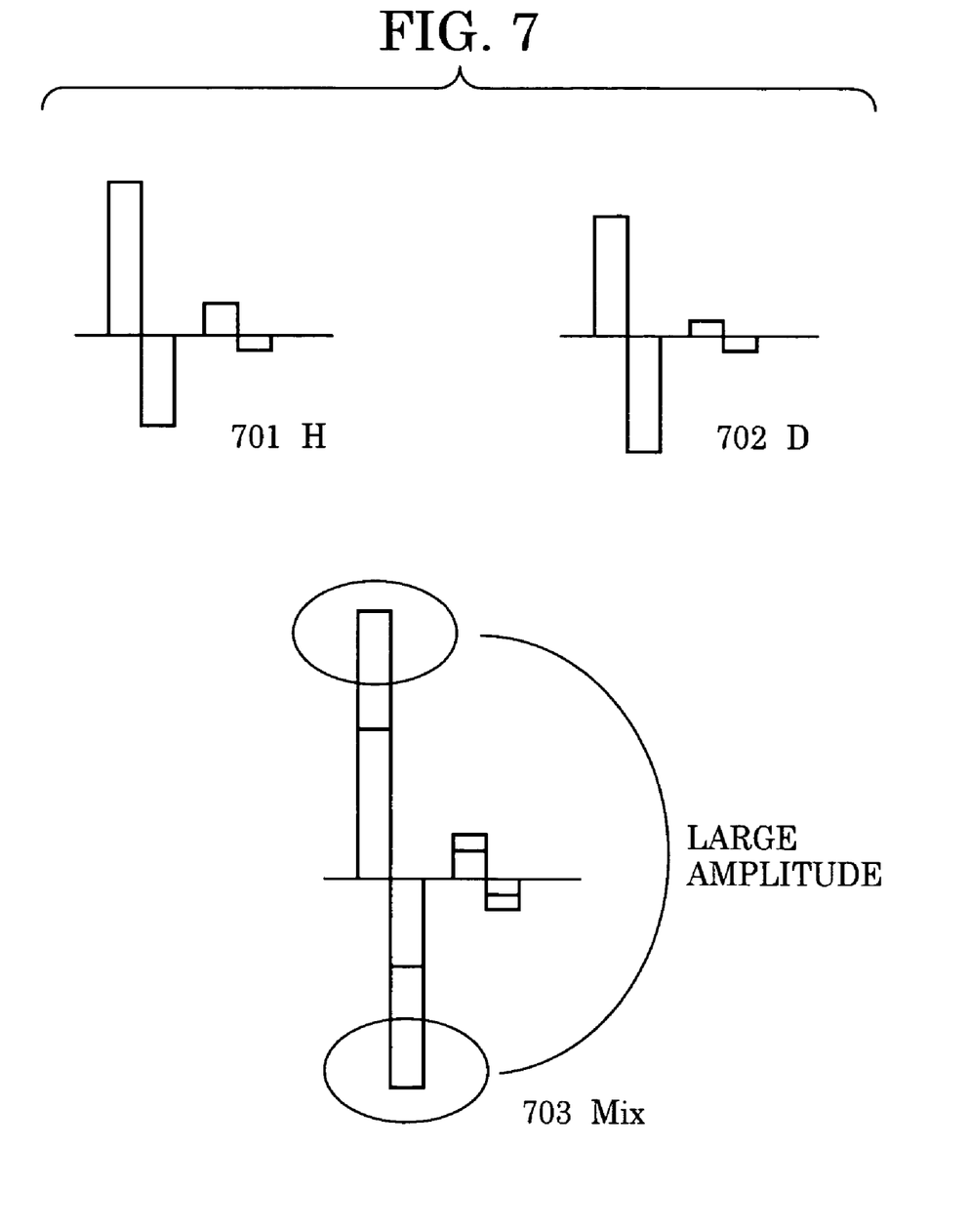
FIG. 7 shows an example of the generation of a resultant edge signal having an abnormally large amplitude within the region of arrow a of FIG. 6.

FIG. 7 shows an example of the generation of a resultant edge signal having an abnormally large amplitude in the region shown by arrow a of FIG. 6. Referring to FIG. 7, the horizontal bandpass filter 502 generates a horizontal edge signal H having a waveform 701 in the region shown by the arrow a of FIG. 6. The diagonal bandpass filter 504 generates a diagonal edge signal D having a waveform 702 in the region shown by the arrow a of FIG. 6. In this case (the amplitude of a vertical edge signal is zero), as shown in FIG. 7, the maximum amplitude of a resultant edge signal Mix having a waveform 703 is too large compared to a predetermined value obtained by superimposing the amplitude of the diagonal edge signal on that of the horizontal edge signal. The disadvantage is that unnatural edge enhancement is caused by the above resultant edge signal (enhancement signal) having the abnormally large amplitude.

SUMMARY OF THE INVENTION

The present invention is made in consideration of the above-mentioned problems by providing an edge enhancement system and method capable of preventing unnatural edge enhancement in images such as complex video images.

According to an aspect of the present invention, an edge enhancement system for images is disclosed. The edge enhancement system includes: a plurality of bandpass filters for extracting high frequency signals of a digital image signal sampled every predetermined unit; an adder for adding the high frequency signals generated from the respective bandpass filters to produce a first high frequency signal; a maximum value detector for detecting the maximum value of the high frequency signals for each sampling to produce a second high frequency signal; a minimum value detector for detecting the minimum value of the high frequency signals for each sampling to produce a third high frequency signal; and a weight adder for determining weights for the first, second, and third high frequency signals on the basis of the value of the first high frequency signal and adding the first high frequency signal to the second or third high frequency signal according to the weights to produce a fourth high frequency signal.

The present invention further provides an edge enhancement method including the steps of receiving a sampled digital image signal and then extracting high frequency signals from the sampled digital image signal. Next, a first high frequency signal is produced by combining the extracted high frequency signals, and then a maximum value of the high frequency signals for each sampling is determined to produce a second high frequency signal. A minimum value of the high frequency signals for each sampling to produce a third high frequency signal is determined and weights for the first, second, and third high frequency signals based on the first high frequency signal are also determined. Based on the determined weights, the method adds the first high frequency signal to either the second or third high frequency signal to produce a fourth high frequency signal.

According to another aspect of the present invention, when the first high frequency signal has an abnormally large amplitude, the weight for the first high frequency signal is set to a low value and the weight for the second or third high frequency signal is set to a high value. Accordingly, the fourth high frequency signal obtained by adding the above signals according to the weights can be set to the optimum value that is equal to or lower than a predetermined value, namely, a value that is not so extraordinarily large. Thus, in edge enhancement for complex video images, advantageously, unnatural edge enhancement caused by an enhancement signal having an abnormally large amplitude can be prevented and high quality images can be obtained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the present invention will be described in detail in accordance with the accompanying drawings. An imaging system in which an edge enhancement circuit is employed will now be described.

Figure 4:
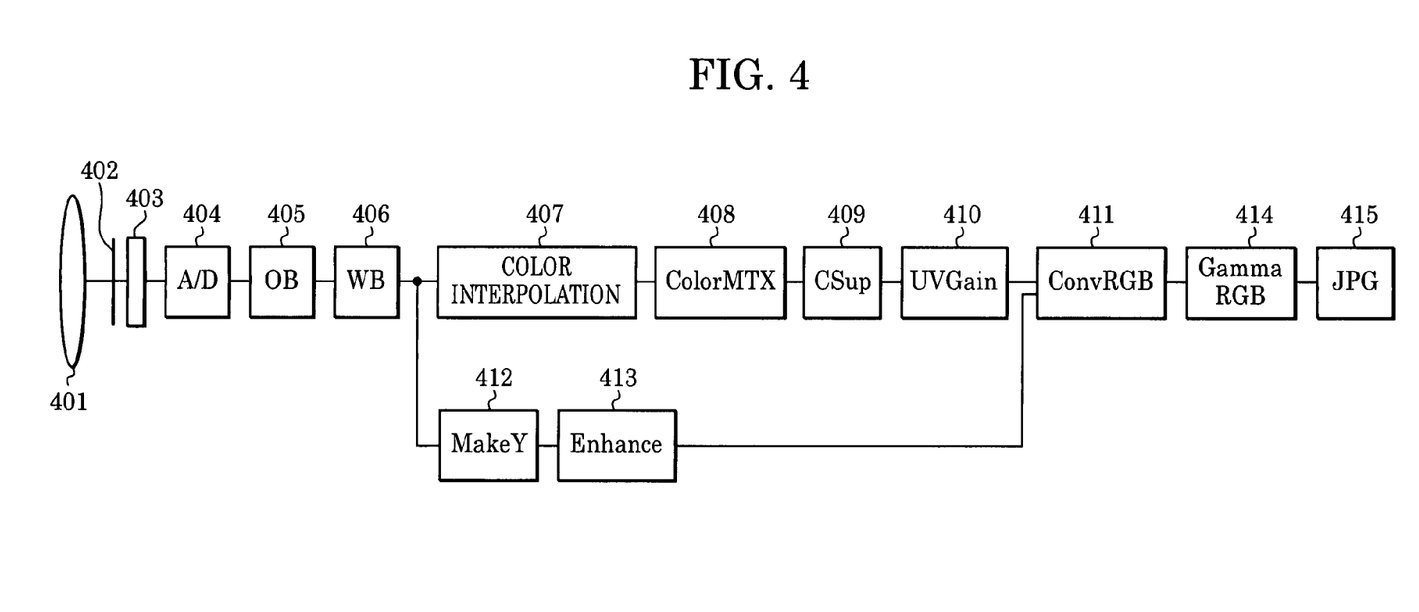
FIG. 4 is a schematic block diagram of an imaging system having an edge enhancement circuit in accordance with an embodiment of the present invention.

FIG. 4 is a schematic block diagram of an imaging system having an edge enhancement circuit in accordance with an embodiment of the present invention. In FIG. 4, a lens 401 and an optical filter 402 form an object image on an imaging device 403. The optical filter 402 includes an optical low-pass filter and an infrared cut filter. The imaging device 403 includes a CCD (charge coupled device) sensor or a CMOS (complementary metal oxide semiconductor) sensor. In this case, the imaging device 403 has RGB (red, green, and blue) color filters.

An analog-to-digital (A/D) converter 404 converts the analog signal output from the imaging device 403 into a digital signal (image data). The image data is subjected to dark noise correction by an optical black circuit (OB) 405 after which a white balance circuit (WB) 406 performs white balance processing on the image data generated from the optical black circuit 405. A color interpolation circuit 407 performs interpolation calculation for each color pixel of the image data output from the white balance circuit 406. A color conversion matrix (MXT) circuit (ColorMTX) 408 converts the image data (R, G, and B signals), subjected to interpolation calculation and generated from the color interpolation circuit 407, into YUV data. The YUV data consists of a Y signal representing the luminance signal, a U signal, which is the difference between the luminance signal and the R component, and a V signal, which represents the difference between the luminance signal and the B component.

A chroma suppress circuit (CSup) 409 processes the YUV data to suppress the colors of chroma components within a saturation region. A UV gain circuit (UVGain) 410 applies arbitrary gains to the U and V signals included in the YUV data generated from the chroma suppress circuit 409, respectively.

In addition, the image data generated from the white balance circuit 406 is also supplied to a luminance-signal (Y-signal) generation circuit (MakeY) 412. The Y-signal generation circuit 412 performs interpolation calculation on the image data to produce a luminance signal. An edge enhancement circuit (Enhance) 413 uses the produced luminance signal to perform edge enhancement processing (e.g., edge emphasis).

Figure 1:
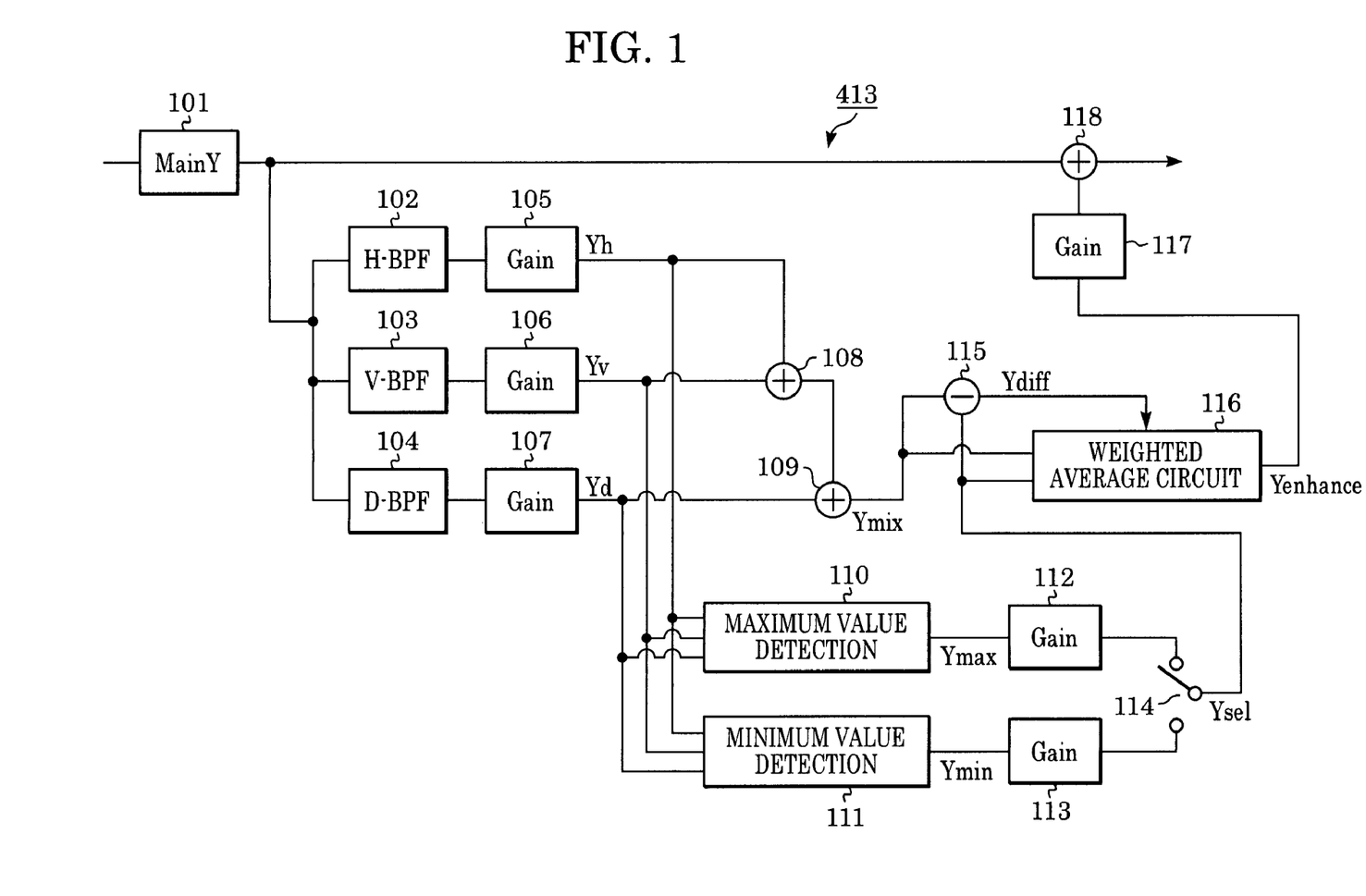
FIG. 1 is a schematic block diagram of an edge enhancement circuit 413 according to an embodiment of the present invention.

A luminance-signal generation circuit (MainY) 101, shown in FIG. 1, generates a main luminance signal based on a luminance signal generated from the Y-signal generation circuit 412 in FIG. 4. A horizontal bandpass filter (H-BPF) 102 detects a horizontal edge component of the main luminance signal generated from the luminance-signal generation circuit 101 to generate a horizontal edge signal. A vertical bandpass filter (V-BPF) 103 detects a vertical edge component of the main luminance signal of the luminance-signal generation circuit 101 to generate a vertical edge signal. A diagonal bandpass filter (D-BPF) 104 detects a diagonal edge component of the main luminance signal of the luminance-signal generation circuit 101 to generate a diagonal edge signal.

A gain circuit 105 applies an arbitrary gain to the horizontal edge signal generated from the horizontal bandpass filter 102 to control the amplitude of the signal and then generates an amplitude-controlled horizontal edge signal Yh. Similarly, a gain circuit 106 applies an arbitrary gain to the vertical edge signal generated from the vertical bandpass filter 103 to control the amplitude of the signal and generates an amplitude-controlled vertical edge signal Yv. A gain circuit 107 applies an arbitrary gain to the diagonal edge signal generated from the vertical bandpass filter 104 to control the amplitude of the signal and generates an amplitude-controlled diagonal edge signal Yd.

An RGB conversion circuit (ConvRGB) 411 converts the U and V signals generated from the UV gain circuit 410 and the luminance signal generated from the edge enhancement circuit 413 into RGB data. A gamma correction circuit (GammaRGB) 414 performs gamma correction on the RGB data generated from the RGB conversion circuit 411. A JPG conversion circuit (JPG) 415 converts the RGB data generated from the gamma correction circuit 414 into JPEG (Joint Photographic Experts Group) image data. The JPEG image data is then recorded onto a recording medium (not shown) that is detachable from the imaging system.

First Embodiment

First, the schematic structure of an edge enhancement system included in an imaging system (for example, like a digital camera) according to an embodiment of the present invention. FIG. 1 shows an edge enhancement circuit according to an embodiment of the present invention. This edge enhancement circuit 413 in FIG. 1 is employed in the imaging system of FIG. 4.

A luminance-signal generation circuit (MainY) 101 generates a main luminance signal based on a luminance signal generated from the Y-signal generation circuit 412 in FIG. 4. A horizontal bandpass filter (H-BPF) 102 detects a horizontal edge component of the main luminance signal generated from the luminance-signal generation circuit 101 to generate a horizontal edge signal. A vertical bandpass filter (V-BPF) 103 detects a vertical edge component of the main luminance signal of the luminance-signal generation circuit 101 to generate a vertical edge signal. A diagonal bandpass filter (D-BPF) 104 detects a diagonal edge component of the main luminance signal of the luminance-signal generation circuit 101 to generate a diagonal edge signal.

A gain circuit 105 applies an arbitrary gain to the horizontal edge signal generated from the horizontal bandpass filter 102 to control the amplitude of the signal and generates an amplitude-controlled horizontal edge signal Yh. Similarly, a gain circuit 106 applies an arbitrary gain to the vertical edge signal generated from the vertical bandpass filter 103 to control the amplitude of the signal and generates an amplitude-controlled vertical edge signal Yv. A gain circuit 106 applies an arbitrary gain to the diagonal edge signal generated from the vertical bandpass filter 104 to control the amplitude of the signal and generates an amplitude-controlled diagonal edge signal Yd.

An adder 108 adds the horizontal edge signal Yh to the vertical edge signal Yv. An adder 109 adds the output of the adder 108 to the diagonal edge signal Yd to generate a resultant edge signal Ymix. In other words, the adders 108 and 109 add the horizontal edge signal Yh, the vertical edge signal Yv, and the diagonal edge signal Yd shown in the following Expression 1 to produce the resultant edge signal Ymix.

$$Ymix = Yh + Yv + Yd \quad \text{(Expression 1)}$$

For every pixel, a maximum value detection circuit 110 detects the maximum value from values of the horizontal edge signal Yh, the vertical edge signal Yv, and the diagonal edge signal Yd to generate a maximum signal Ymax. A minimum value detection circuit 111 detects the minimum value from values of the horizontal edge signal Yh, the vertical edge signal Yv, and the diagonal edge signal Yd every pixel to generate a minimum signal Ymin. A gain circuit 112 controls the amplitude of the maximum signal Ymax. A gain circuit 113 controls the amplitude of the minimum signal Ymin. When the edge signal Ymix is positive, a selection circuit 114 selects the amplitude-controlled maximum signal Ymax generated from the gain circuit 112 and outputs the selected signal as a selection signal Ysel. When the edge signal Ymix is negative, the selection circuit 114 selects the amplitude-controlled minimum signal Ymin generated from the gain circuit 113 and outputs the selected signal as the selection signal Ysel.

A subtractor 115 subtracts the selection signal Ysel from the edge signal Ymix to produce a difference signal Ydiff. According to the present embodiment, the difference signal Ydiff indicates the absolute value of the difference between the edge signal Ymix and the selection signal Ysel.

Figure 3:
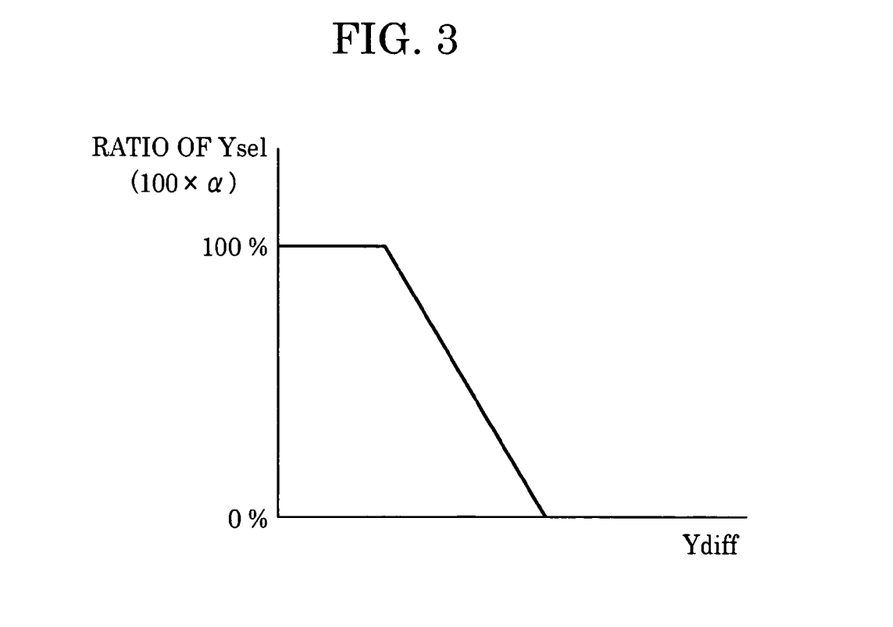
FIG. 3 is a diagram showing the input-output characteristic of a weighted additional coefficient calculation circuit included in a weighted average circuit 116.

A weighted average circuit 116 applies weighting and averaging to the edge signal Ymix and the selection signal Ysel on the basis of the difference signal Ydiff to produce an enhancement signal Yenhance. Specifically, to calculate a weighted additional coefficient $\alpha$ ($0 \leq \alpha \leq 1$) on the basis of the difference signal Ydiff, the weighted average circuit 116 includes a weighted additional coefficient calculation circuit (not shown) having the input-output characteristic shown in FIG. 3. The weighted additional coefficient calculation circuit calculates the weighted additional coefficient $\alpha$ to determine the ratio of the edge signal Ymix to the selection signal Ysel to be added on the basis of the difference signal Ydiff. As shown in FIG. 3, as the difference signal Ydiff becomes larger, the weighted additional coefficient calculation circuit obtains the weighted additional coefficient $\alpha$ so that the coefficient $\alpha$ approaches 0. As the difference signal Ydiff becomes smaller, the weighted additional coefficient calculation circuit calculates the weighted additional coefficient $\alpha$ so that the coefficient $\alpha$ approaches 1. The weighted average circuit 116 calculates the following Expression 2 using the edge signal Ymix, the selection signal Ysel, and the weighted additional coefficient $\alpha$ which is obtained based on the difference signal Ydiff, thus producing the enhancement signal Yenhance.

$$Yenhance = Ysel \times \alpha + Ymix \times (1-\alpha) \quad \text{(Expression 2)}$$

In other words, when the difference signal Ydiff is large, the weighted average circuit 116 determines that the edge signal Ymix has an abnormally large amplitude in a region of the spatial frequency domain where the outputs of the bandpass filters overlap each other as shown by the arrow a of FIG. 6 and uses Expression 2 and the weighted additional coefficient $\alpha = 1.0$ to obtain the enhancement signal Yenhance. Since the addition ratio of the selection signal Ysel is large and the addition ratio of the edge signal Ymix is small, the enhancement signal Yenhance can be produced without being influenced by the edge signal Ymix having the abnormally large amplitude. When the difference signal Ydiff is small, the weighted average circuit 116 determines that the amplitude of the edge signal Ymix is small in the region of the spatial frequency domain where the outputs of the bandpass filters do not overlap each other or even where the outputs of the bandpass filters overlap each other, and calculates Expression 2 using the weighted additional coefficient $\alpha = 0.0$ to obtain the enhancement signal Yenhance. In this case, the addition ratio of the selection signal Ysel is small and the addition ratio of the edge signal Ymix is large in the enhancement signal Yenhance, resulting in effective edge enhancement using the value of the edge signal Ymix.

The input-output characteristic of the weighted additional coefficient calculation circuit is not limited to that shown in FIG. 3. The following input-output characteristic may be used: As the difference signal Ydiff becomes larger, the weighted additional coefficient $\alpha$ approaches 1. As the difference signal Ydiff is smaller, the weighted additional coefficient $\alpha$ approaches 0.

Figure 2A:
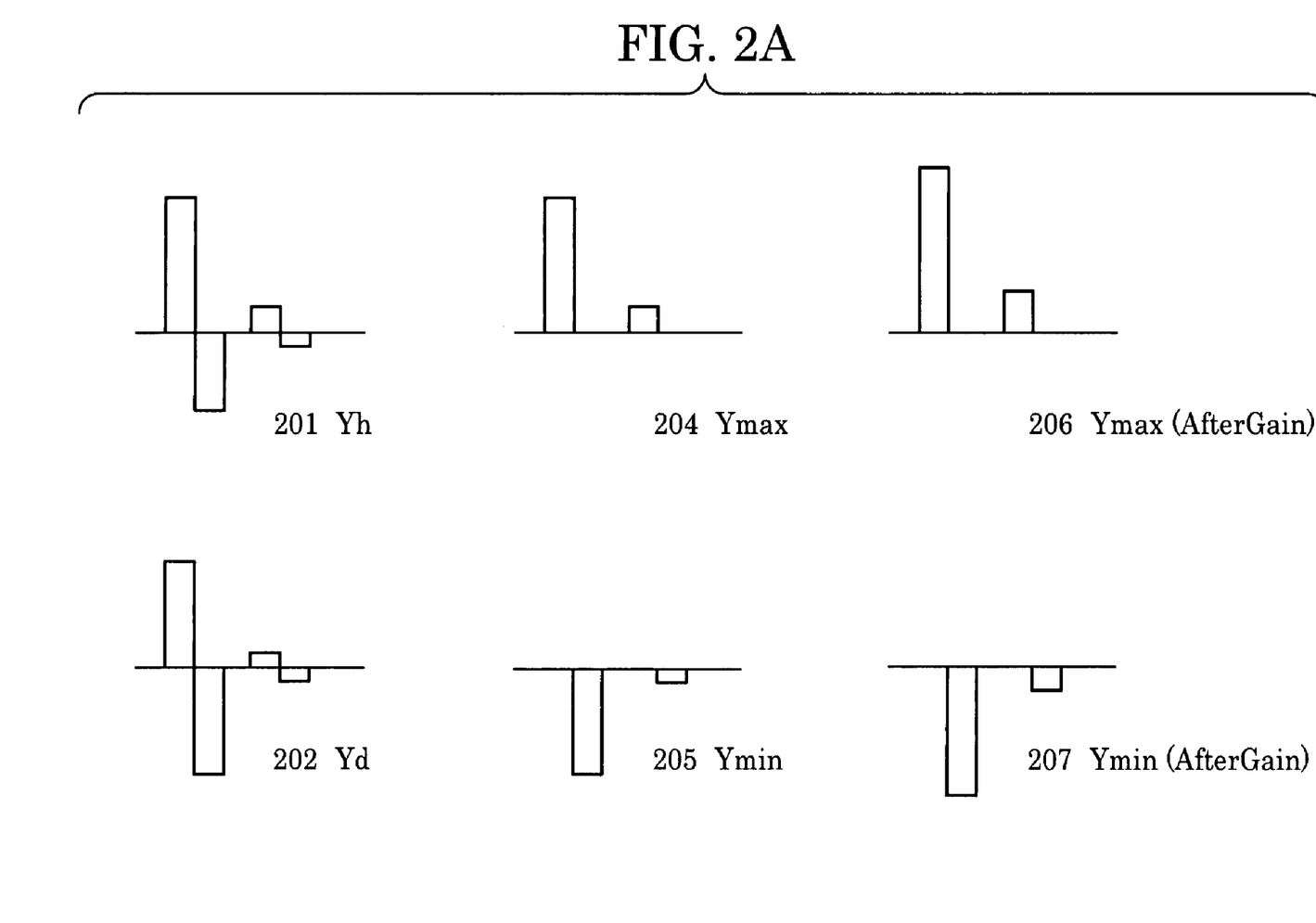
FIG. 2A shows output signal waveforms of components of the edge enhancement circuit 413 shown in FIG. 1.
Figure 2B:
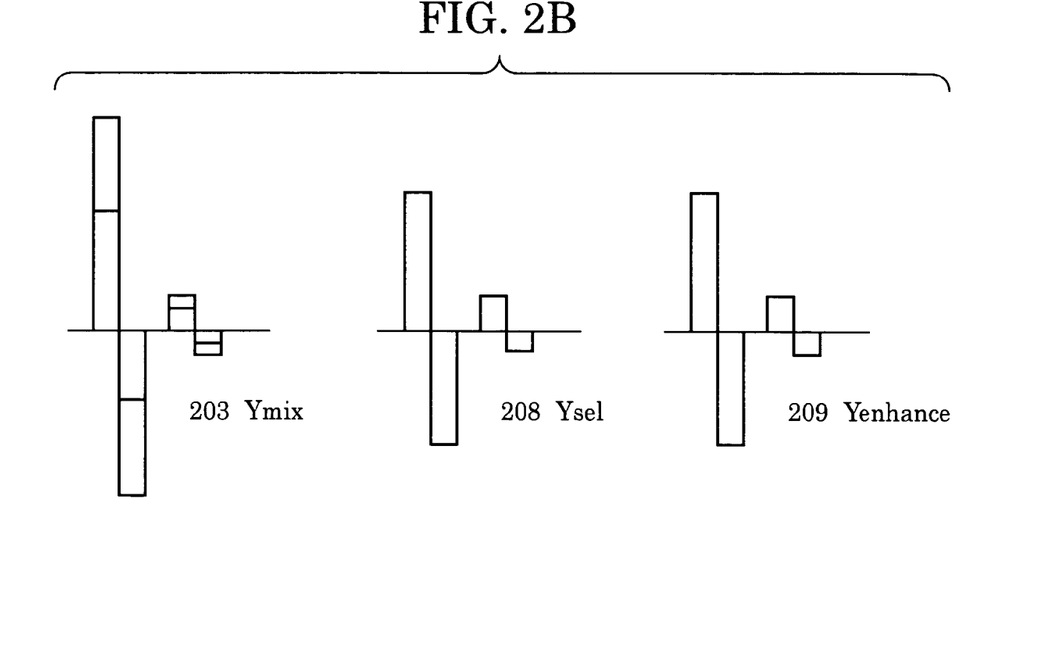
FIG. 2B shows output signal waveforms of components of the edge enhancement circuit 413 in FIG. 1.

The operation of the edge enhancement circuit 413 in FIG. 1 will now be described with reference to FIGS. 2A and 2B. FIGS. 2A and 2B show examples of output signal waveforms of the edge enhancement circuit 413 in FIG. 1. The output signal waveforms are generated when a luminance signal in, for example, the frequency region shown by the arrow a of FIG. 6 is processed by the edge enhancement circuit 413. Note that the luminance signal is obtained by capturing a vertically striped object, and the output Yv of the vertical bandpass filter 103 indicates zero. In FIGS. 2A and 2B, the luminance signal and various signals obtained by processing the luminance signal are digital. Each digital signal consists of discrete values sampled every pixel.

In FIG. 2A, the horizontal edge signal Yh has a signal waveform 201. The horizontal edge signal Yh is generated from the gain circuit 105, which controls the amplitude of the output signal of the horizontal bandpass filter 102. The diagonal edge signal Yd has a signal waveform 202. The diagonal edge signal Yd is generated from the gain circuit 107 that controls the amplitude of the output signal of the diagonal bandpass filter 104. Referring to FIG. 2B, the resultant edge signal, Ymix is a combination of Yh, Yv and Yd and also has a signal waveform 203. Specifically, the edge signal Ymix is generated by adding the horizontal edge signal Yh (signal waveform 201) and the diagonal edge signal Yd (signal waveform 202) by using the adders 108 and 109.

Referring to FIG. 2A, the maximum signal Ymax has a signal waveform 204. The maximum signal Ymax is output by the maximum value detection circuit 110 based on inputs from Yh and Yd (signal waveforms 201 and 202, respectively). The minimum signal Ymin has a signal waveform 205. The minimum signal Ymin is output by the minimum value detection circuit 111 based on inputs from Yh and Yd (201 and 202). The maximum signal Ymax, subjected to amplitude control through the gain circuit 112, has a signal waveform 206. The minimum signal Ymin, subjected to amplitude control through the gain circuit 113, has a signal waveform 207.

When the edge signal Ymix is positive, the selection circuit 114 selects the signal waveform 206. On the other hand, when the edge signal Ymix is negative, the selection circuit 114 selects the signal waveform 207. In FIG. 2B, the selection signal Ysel has a signal waveform 208. The selection signal Ysel is obtained by combining the maximum and minimum values of the signals generated from the respective bandpass filters.

The subtractor 115 generates the difference signal Ydiff indicating the absolute value of the difference between the signal waveform 203 of the edge signal Ymix and the signal waveform 208 of the selection signal Ysel. Subsequently, the weighted average circuit 116 performs weighting and averaging on the edge signal Ymix and the selection signal Ysel on the basis of the difference signal Ydiff to produce the enhancement signal Yenhance having a signal waveform 209 shown in FIG. 2B. When the edge signal Ymix with the signal waveform 203 has an abnormally large amplitude, the enhancement signal Yenhance can be equal to or approximate to the value of the selection signal Ysel with the signal waveform 208, which has a normal amplitude.

OTHER EMBODIMENTS

The imaging system is not limited to that shown in FIG. 4. So long as edge enhancement can be performed on an image signal such as a luminance signal and on RGB signals, any imaging system within the spirit and scope of the present invention may be used. An object to be subjected to edge enhancement is not limited to a luminance signal. RGB signals and a complementary color signal can be subjected to edge enhancement. Although shown with three filters, the edge enhancement circuit 413 of FIG. 1 can employ two or more filters. The gain circuits are arranged in various locations in the edge enhancement circuit 413 in FIG. 1. If amplitude control is not needed, any gain circuit can be omitted.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An edge enhancement system comprising:
a plurality of bandpass filters for extracting high frequency signals of a sampled digital image signal;
an adder for adding the high frequency signals generated from the respective bandpass filters to produce a first high frequency signal;
a maximum value detector for detecting the maximum value of the high frequency signals for each sampling to produce a second high frequency signal;
a minimum value detector for detecting the minimum value of the high frequency signals for each sampling to produce a third high frequency signal; and
a weight adder for determining weights for the first, second, and third high frequency signals on the basis of the value of the first high frequency signal and adding the first high frequency signal to the second or third high frequency signal according to the weights to produce a fourth high frequency signal,
wherein when the first high frequency signal has a positive value, the weight adder determines the weights based on the difference between the first and second high frequency signals and adds the first and second high frequency signals according to the determined weights, or when the first high frequency signal has a negative value, the weight adder determines the weights based on the difference between the first and third high frequency signals and adds the first and third high frequency signals according to the determined weights, thus producing the fourth high frequency signal.

2. The system according to claim 1, wherein the weight adder determines the weights such that when the first high frequency signal has a positive value, the weight adder reduces the weight for the first high frequency signal lower than the weight for the second high frequency signal according to an increase in the difference therebetween, and when the first high frequency signal has a negative value, the weight adder reduces the weight for the first high frequency signal lower than the weight for the third high frequency signal according to an increase of the difference therebetween.

3. The system according to claim 1, wherein the number of kinds of bandpass filters is determined based on the number of directions for extracting high frequency components from an image composed of the digital image signals.

4. The system according to claim 3, wherein the directions for extracting the high frequency components include at least two directions of the horizontal, vertical, and diagonal directions.

5. An imaging system comprising:
a plurality of bandpass filter means for extracting high frequency signals of a digital image signal sampled every predetermined unit;
an adder means for adding the high frequency signals generated from the respective bandpass filter means to produce a first high frequency signal;
a maximum value detection means for detecting the maximum value of the high frequency signals for each sampling to produce a second high frequency signal;
a minimum value detection means for detecting the minimum value of the high frequency signals for each sampling to produce a third high frequency signal; and
a weight adder means for determining weights for the first, second, and third high frequency signals on the basis of the value of the first high frequency signal and adding the first high frequency signal to the second or third high frequency signal according to the weights to produce a fourth high frequency signal,
wherein when the first high frequency signal has a positive value, the weight adder determines the weights based on the difference between the first and second high frequency signals and adds the first and second high frequency signals according to the determined weights, or when the first high frequency signal has a negative value, the weight adder determines the weights based on the difference between the first and third high frequency signals and adds the first and third high frequency signals according to the determined weights, thus producing the fourth high frequency signal.

6. An edge enhancement method comprising:
a high frequency output step of extracting high frequency signals of a digital image signal sampled every predetermined unit;
an adding step of adding the high frequency signals generated in the high frequency output step to produce a first high frequency signal;
a maximum value detecting step of detecting the maximum value of the high frequency signals for each sampling to produce a second high frequency signal;
a minimum value detecting step of detecting the minimum value of the high frequency signals for each sampling to produce a third high frequency signal; and
a weight adding step of determining weights for the first, second, and third high frequency signals on the basis of the value of the first high frequency signal and adding the first high frequency signal to the second or third high frequency signal according to the weights to produce a fourth high frequency signal,
wherein when the first high frequency signal has a positive value, the weight adder determines the weights based on the difference between the first and second high frequency signals and adds the first and second high frequency signals according to the determined weights, or when the first high frequency signal has a negative value, the weight adder determines the weights based on the difference between the first and third high frequency signals and adds the first and third high frequency signals according to the determined weights, thus producing the fourth high frequency signal.

7. An edge enhancement system comprising:
a high frequency output unit which extracts high frequency components of a digital image signal sampled every predetermined unit to generate a plurality of high frequency signals;
an addition unit which adds the high frequency signals generated from the high frequency output unit to produce a first high frequency signal;
a selection unit which selects either the second high frequency signal having the maximum value or the third high frequency signal having the minimum value detected from the high frequency signals every sampling on the basis of the value of the first high frequency signal; and
a weight addition unit which determines weights for the first high frequency signal and the selected second or third high frequency signal and adding the first high frequency signal to the second or third high frequency signal according to the weights to produce a fourth high frequency signal,
wherein when the first high frequency signal has a positive value, the weight addition unit determines the weights based on the difference between the first and second high frequency signals and adds the first and second high frequency signals according to the determined weights, or when the first high frequency signal has a negative value, the weight addition unit determines the weights based on the difference between the first and third high frequency signals and adds the first and third high frequency signals according to the determined weights, thus producing the fourth high frequency signal.

8. An imaging system comprising:
a high frequency output part which extracts high frequency components of a digital image signal sampled every predetermined unit to generate a plurality of high frequency signals;
an addition part which adds the high frequency signals generated from the high frequency output part to produce a first high frequency signal;
a selection part which selects either the second high frequency signal having the maximum value or the third high frequency signal having the minimum value detected from the high frequency signals every sampling on the basis of the value of the first high frequency signal; and
a weight addition part which determines weights for the first high frequency signal and the selected second or third high frequency signal and adding the first high frequency signal to the second or third high frequency signal according to the weights to produce a fourth high frequency signal,
wherein when the first high frequency signal has a positive value, the weight addition unit determines the weights based on the difference between the first and second high frequency signals and adds the first and second high frequency signals according to the determined weights, or when the first high frequency signal has a negative value, the weight addition unit determines the weights based on the difference between the first and third high frequency signals and adds the first and third high frequency signals according to the determined weights, thus producing the fourth high frequency signal.

9. An edge enhancement method comprising:
a high frequency output step of extracting high frequency components of a digital image signal sampled every predetermined unit to generate a plurality of high frequency signals;
an adding step of adding the high frequency signals generated in the high frequency output step to produce a first high frequency signal;
a selecting step of selecting either a second high frequency signal having the maximum value or a third high frequency signal having the minimum value detected from the high frequency signals every sampling on the basis of the value of the first high frequency signal; and
a weight addition step of determining weights for the first high frequency signal and the selected second or third high frequency signal and adding the first high frequency signal to the second or third high frequency signal according to the weights to produce a fourth high frequency signal,
wherein when the first high frequency signal has a positive value, the weight addition unit determines the weights based on the difference between the first and second high frequency signals and adds the first and second high frequency signals according to the determined weights, or when the first high frequency signal has a negative value, the weight addition unit determines the weights based on the difference between the first and third high frequency signals and adds the first and third high frequency signals according to the determined weights, thus producing the fourth high frequency signal.

* * * * *